United States Patent Office 3,386,266
Patented June 4, 1968

3,386,266
SLIP COUPLING
Victor J. Grumblatt, Erie, Pa., assignor to Lord Corporation, Erie, Pa., a corporation of Pennsylvania
Filed June 2, 1966, Ser. No. 554,702
6 Claims. (Cl. 64—30)

ABSTRACT OF THE DISCLOSURE

A flexible coupling in which a friction driven element between concentric driving and driven members is a body of elastomer having at least two radially extending flexing sections, each section having nonextensible means disposed in the elastomer of said section to increase the compression stiffness of the elastomer and the resultant friction grip.

---

This invention is an elastomeric slip coupling which has a high overload or slip torque and a soft torsional spring rate permitting it to accommodate considerable torsional motion between the driving and driven members. In a preferred form, this result is obtained by laminating the elastomer with nonextensible cylindrical segments concentric with the axis of the coupling. The segments restrain bulging of the elastomer under radial compression loads and thereby increase the torque at which the coupling slips.

Figure 1:
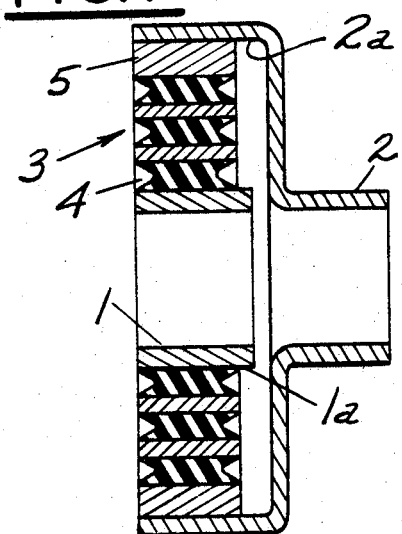
Figure 2:
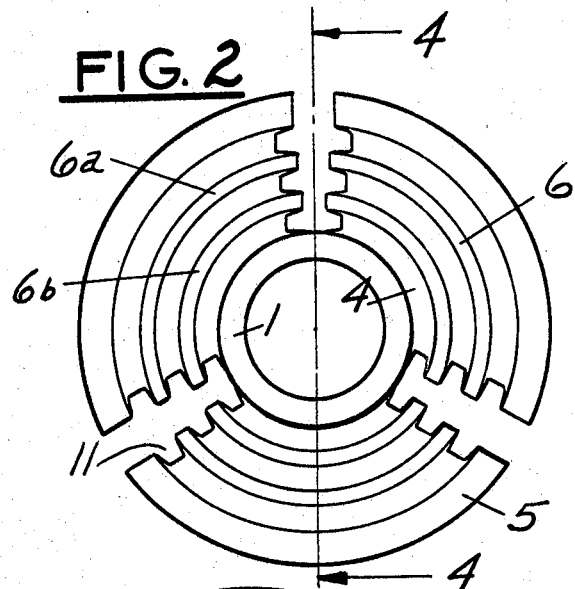
Figure 4:
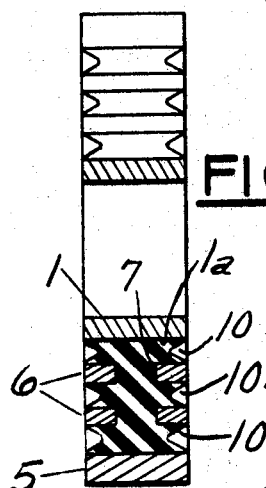
Figure 3:
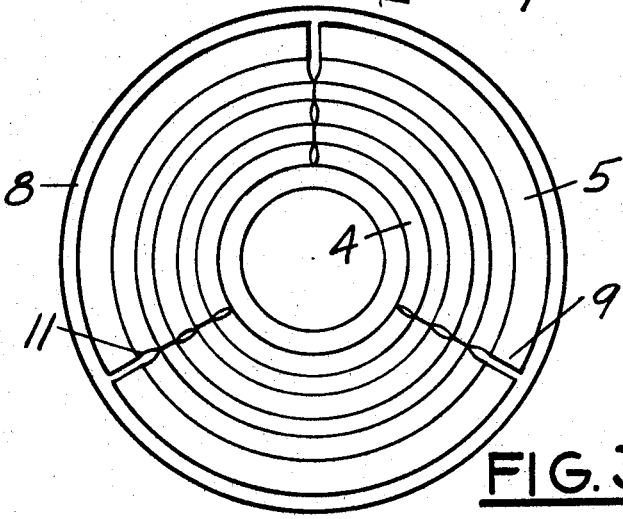
Figure 2A:
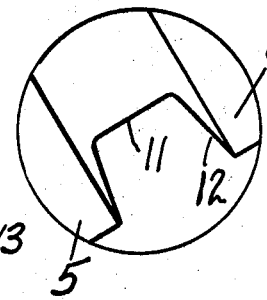
Figure 5:
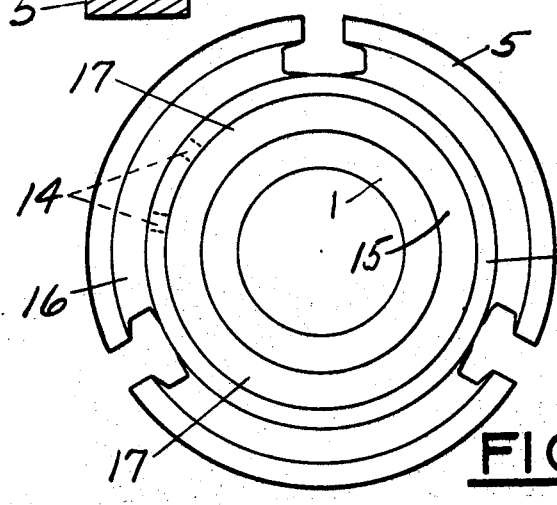

In the drawing, FIG. 1 is a sectional side elevation of a flexible coupling; FIG. 2 is an end view of the flexing element of the coupling prior to assembly; FIG. 2a is an enlarged view of a portion of FIG. 2; FIG. 3 is an end view of flexing element after assembly; FIG. 4 is a section on line 4—4 of FIG. 2; and FIG. 5 is an end view of a modification of the flexing element.

The coupling comprises concentric driving and driven members 1 and 2 having radially opposed cylindrical inner and outer driving surfaces 1a and 2a and a flexing section 3 forming the torque transmitting connection between the driving surfaces of the members.

As shown in greater detail in FIGS. 2, 3 and 4, the flexing sections comprise radially extending segmental bodies 4 of elastomer bonded to the radially outwardly presented driving surface 1a of the member 1 and to the radially inwardly presented inner surfaces of segmental cylindrical shoes 5 of friction material. Bonded and embedded in the elastomer between the member 1 and each shoe 5 are one or more concentric radially spaced segmental cylindrical shims 6 of rigid or nonextensible material such as metal or plastic whose function is to restrain bulging of the elastomer 4 under radial compression loads. In edge view, the bodies 4 consists of thin layers or laminations of elastomer and shims bonded together. The shims 6 have one or more perforations 7 whose function is to distribute the elastomer uniformly during molding. Shims 6 will increase the radial stiffness of the coupling manyfold. Torsional stiffness would only increase in proportion to the thickness lost by the addition of shims to the coupling. Additional control of the radial stiffness may be had by proportioning the length of the shim. If the ends of the shims are out of contact, all of the elastomer is effective in radial compression. When the ends of the shims contact each other, the elastomer radially inward of such shims is no longer effective to exert a radial compression force on the shoes 5. The maximum radial stiffness is obtained when the ends of shims 6a contact each other after assembly. A lesser radial stiffness is obtained when only the ends of the shims 6a contact each other. A still lower radial stiffness is obtained when the ends of none of the shims contact each other. This premits a wide variation in the radial forces exerted on the shoes. Even when the ends of none of the shims contact, the radial stiffness is many times that of the elastomer without any shims. The radial compression of the elastomer improves its fatigue life.

Prior to assembly, when the elastomer is in the unstressed condition, the outside diameter of the outer surfaces of the friction shoes 5 is greater than the inside diameter of the outer driving surface 2a. In assembly, the flexing element 3 is pressed into the smaller diameter cup-shaped flange 8 of the member 2, thereby placing the elastomer under radial compression and insuring a friction grip between the shoes 5 and the flange 8. In order to permit free action of the elastomer when the friction shoes are of rigid material, there is in the assembled position a slight gap 9 between the adjacent ends of the shoes 5. This permits the friction grip of the shoes 5 to be controlled by the radial stiffness of the elastomer. In order to reduce stresses on the bond to the elastomer and to increase the fatigue or flexing life, the axially facing ends of the sections of elastomer between the shims 6 and between the shims and the member 1 and shoes 5 are provided with inwardly extending annular tapered grooves 10 which have side walls 10a respectively closely spaced from the inner surfaces of the shoes 5 and from the inner and outer surfaces of the shims 6 thereby providing relatively thin sections 10b of elastomer which are relatively slightly stressed. The thin sections 10b relieve the stress on the bond to the elastomer adjacent the outer edges. Similarly, the circumferentially facing edges of the segmental sections of elastomer between the shims 6 and between the shims 6 and the member 1 and segments 5 are provided with axially extending tapered grooves 11 as shown in FIGS. 2 and 2a. When the elastomer is placed under radial compression by assembly into the flange 8, the elastomer bulges in and partially closes the grooves 11 but due to the tapered edges 12, the grooves 11 are not completely closed and the edges of the bond remain protected after assembly. Note that in the assembled condition shown in FIG. 3, the grooves 11 are considerably shallower than in FIG. 2. The thin sections 12a of the elastomer at the sides of the grooves 11 correspond in structure and in function to the thin sections 10b at the sides of the grooves 10.

In use, the coupling has the soft spring rate in the torsional direction which would be expected from an elastomeric section having a radial thickness equal to the spacing between the outer surface 1a of the member 1 and the inner surfaces of the shoes 5. This allows the coupling to cushion torsional vibrations between the driving and driven member 1 and 2. The coupling has a stiff radial spring rate of the order of that which would be expected from elastomeric sections having a thickness equal to the spacing between adjacent shims 6 which provides a strong friction grip between the shoes 5 and the inner surface of the flange 8 of the member 2. This friction grip provides a high overload torque before slippage occurs. When slippage occurs between the friction shoes 5 and the flange 8, the protection afforded by the coupling is comparable with that afforded by shear pins but with the added advantage that when the torque overload condition is relieved, the slippage stops and the coupling returns to its normal operating condition.

The flexing sections shown in FIGS. 2 to 4 is preferred for heavy duty applications. For lighter duty applications, the flexing elements shown in FIG. 5 can be used where there is an annular ring 13 of rigid material such as metal or plastic spaced between the member 1 and the segmental shoes 5 of friction material. The ring 13 may have several perforations, a few of which are indicated by dotted lines 14. A body 15 of elastomer is bonded to the radially presented outer surface of the member 1, to the radially presented inner surfaces of the segmental shoes 5 and to the radially presented inner and outer surfaces of the ring 13.

The bonding takes places during vulcanization and the perforations 14 permit distribution of the elastomer. The elastomer may have the same axially facing annular grooves 10 as shown in FIG. 4 and the circumferentially facing grooves 11, 12 as shown in FIG. 2a to protect the bond to the elastomer. When assembled into the cup-shaped flange 8 of the member 2, the segmental friction shoes 5 are compressed radially inward, placing the segmental sections 16 of elastomer under radial compression. The annular section 17 of elastomer between the member 1 and the ring 13 is not under radial compression and does not contribute to the friction grip of the shoes 5 on the flange 8 although it does contribute to the torsional stiffness of the coupling.

What is claimed as new is:

1. A flexible coupling comprising driving and driven members have radially opposed inner and outer concentric cylindrical driving surfaces, the outer driving surfaces being presented radially inward and the inner driving surfaces being presented radially outward, segmental cylindrical shoes of friction material having radially outwardly presented outer surfaces presented to and engaging the outer driving surface and radially inwardly presented inner surfaces presented toward said inner driving surface, a body of elastomer between said inner driving surface, and said inner surfaces of said shoes, said elastomer being bonded to said inner driving surface and having at least two radially extending flexing sections bonded to the inner surfaces of the shoes, the outside diameter of the outwardly presented surfaces of the shoes in the unstressed condition of the elastomer being greater than the inside diameter of the outer driving surface, and each section having nonextensible means embedded and bonded in the elastomer of said sections for restricting bulging of the elastomer under radial compression and thereby increasing the compression stiffness of the elastomer and the resultant friction grip between said shoes and said outer surface.

2. The coupling of claim 1 in which the nonextensible means are segmental cylindrical shims.

3. The coupling of claim 1 in which the nonextensible means defines a generally cylindrical path concentric with the driving surfaces and has surfaces bonded to the elastomer concentric with and radially spaced between said inner and outer driving surfaces.

4. The coupling of claim 1 in which the segmental sections of elastomer have grooves in the outer surface thereof with side walls closely spaced from the inner surfaces of the shoes providing thin relatively lightly stressed sections of elastomer adjacent the outer edges of the inner surface of the shoes.

5. The coupling of claim 4 in which the grooves extend axially.

6. The coupling of claim 4 in which the grooves are annular and concentric with the driving and driven members.

References Cited

UNITED STATES PATENTS

| | | |
|---|---|---|
| 2,068,279 | 1/1937 | Piron. |
| 2,069,270 | 2/1937 | Piron. |
| 2,447,384 | 8/1948 | Wolff _____ 64—30 |
| 2,543,396 | 2/1951 | Wolff _____ 64—30 |
| 2,995,907 | 8/1961 | Orain _____ 64—11 |
| 3,020,036 | 2/1962 | Kleinschmidt _____ 64—11 X |
| 3,212,296 | 10/1965 | Benjamen _____ 64—30 |

HALL C. COE, *Primary Examiner.*